No. 735,546. PATENTED AUG. 4, 1903.
B. F. MAYO.
HEEL TRIMMING MACHINE FOR BOOTS OR SHOES.
APPLICATION FILED JAN. 24, 1900.
NO MODEL. 3 SHEETS—SHEET 3.
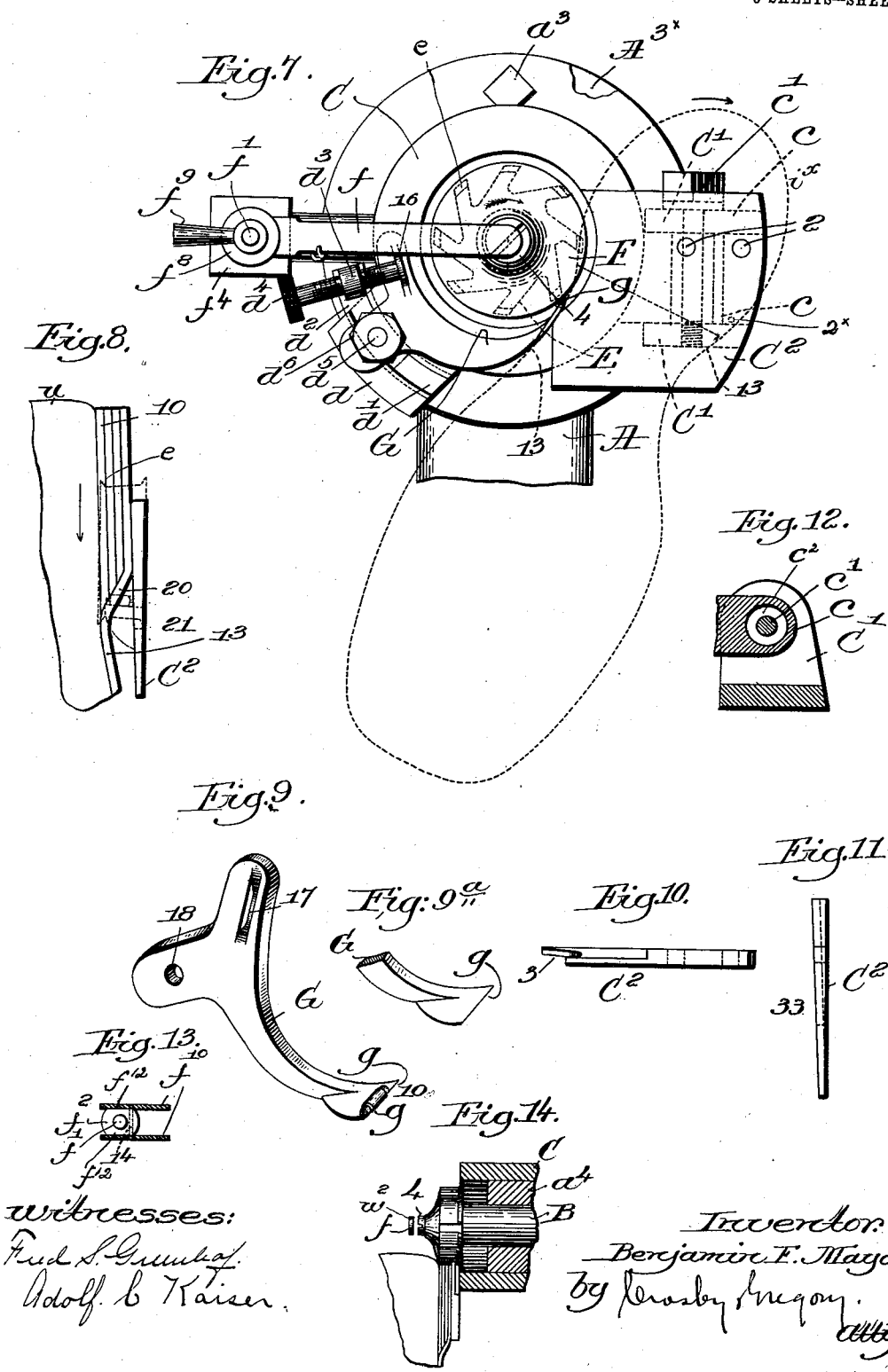

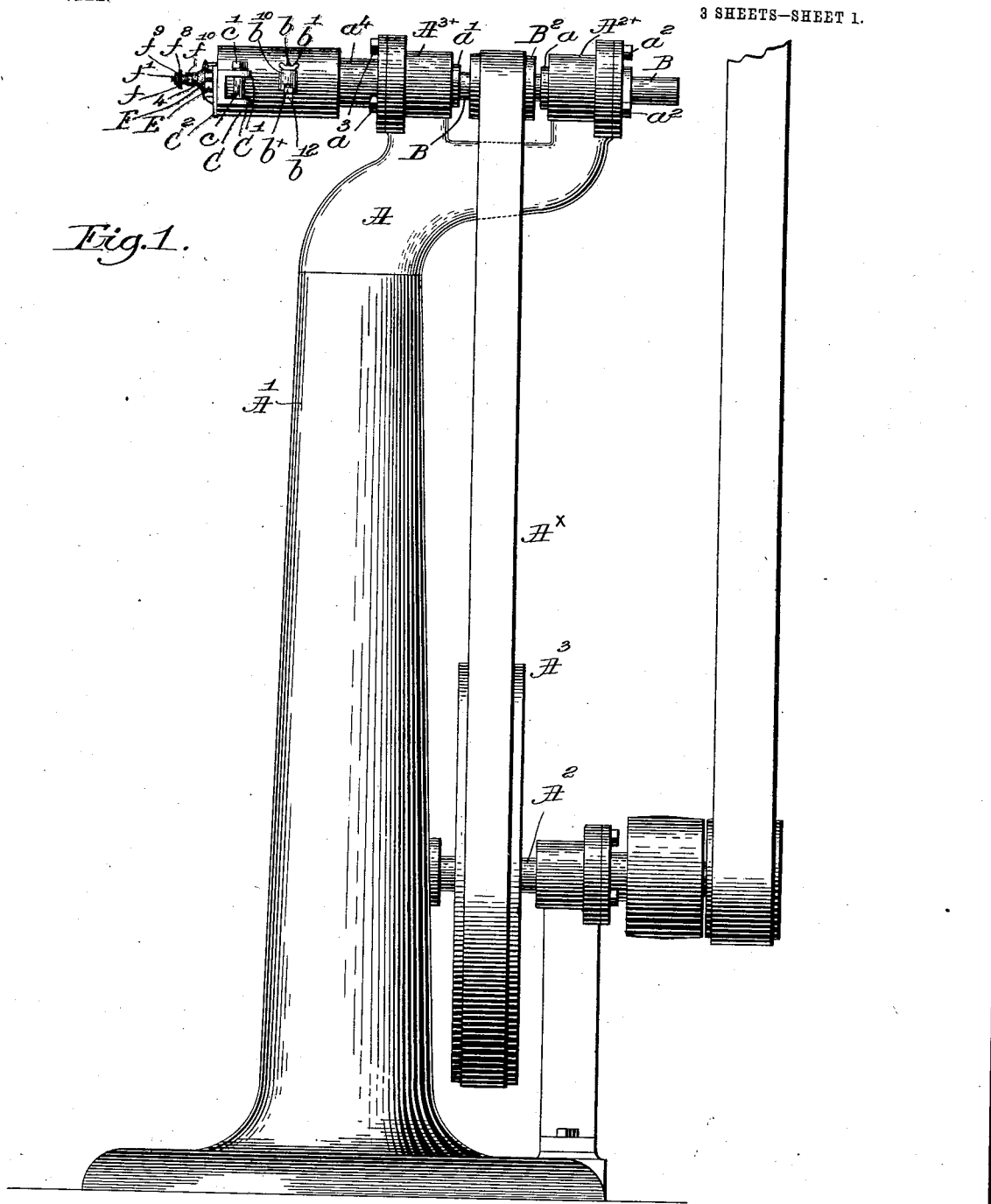

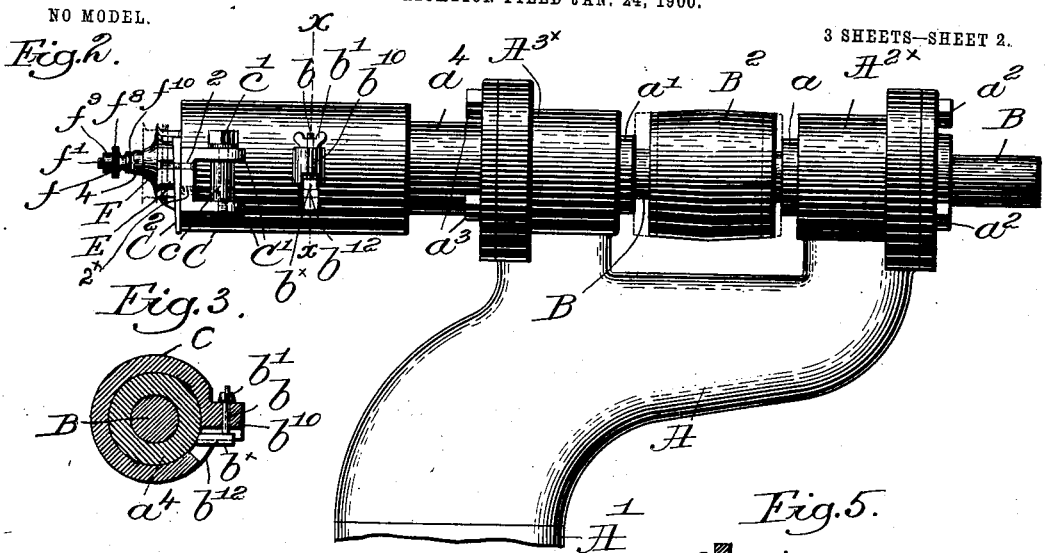
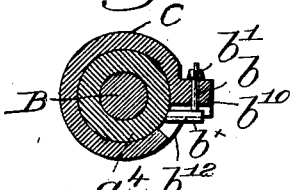
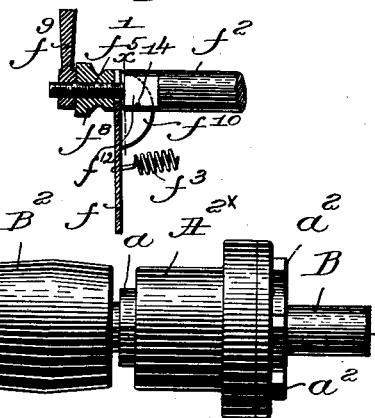
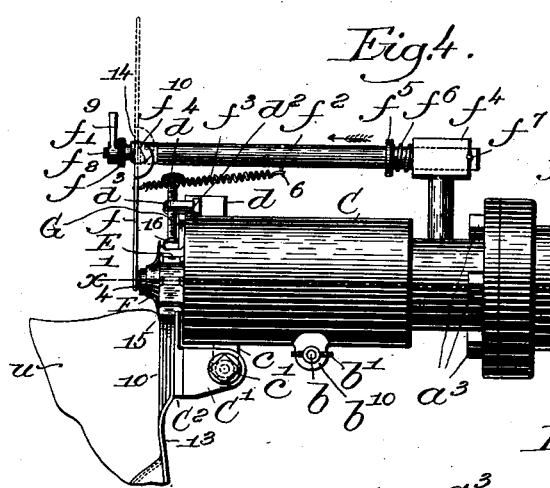
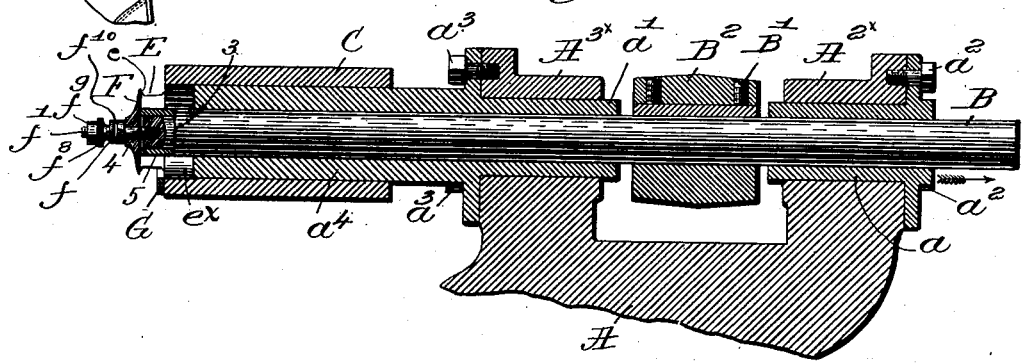

No. 735,546. Patented August 4, 1903.

UNITED STATES PATENT OFFICE.

BENJAMIN F. MAYO, OF SALEM, MASSACHUSETTS, ASSIGNOR TO UNITED SHOE MACHINERY COMPANY, OF PATERSON, NEW JERSEY, A CORPORATION OF NEW JERSEY.

HEEL-TRIMMING MACHINE FOR BOOTS OR SHOES.

SPECIFICATION forming part of Letters Patent No. 735,546, dated August 4, 1903.

Application filed January 24, 1900. Serial No. 2,586. (No model.)

*To all whom it may concern:*

Be it known that I, BENJAMIN F. MAYO, a citizen of the United States, and a resident of Salem, in the county of Essex and State of Massachusetts, have invented an Improvement in Trimming-Machines for Heels, &c., of Boots or Shoes, of which the following description, in connection with the accompanying drawings, is a specification, like characters on the drawings representing like parts.

This invention relates to and has for its object the production of a novel machine for trimming heels of boots and shoes.

The machine is of special utility in trimming what are known as "spring-heels," yet its use is not limited to that particular class of work, as it is adapted for other trimming.

In accordance with my invention I employ for actuating the cutter and its coöperating shield or rand-guide a rotatable shaft adapted to slide automatically in its bearings, as the heel being trimmed varies in thickness. The shaft carrying the cutter has a loose fit in its bearings and is surrounded by a belt-pulley located thereon between the bearings, said pulley being free to move somewhat with the shaft between said bearings without contacting therewith. The cutter is shown as seated at its inner side against a shoulder on said shaft and secured in position by a screw extended through a suitable shield or usual rand-guide, the screw entering a tapped hole in the end of the shaft.

The support for the tread-face of the heel is represented as mounted upon a carrier suitably supported, preferably in an adjustable manner, on a fixed part of the machine, said carrier being preferably made as a sleeve concentric with the axis of rotation of the cutter-carrying shaft and capable of angular adjustment about said shaft as well as adjustment longitudinally of the shaft, said sleeve surrounding an extension of one of the bearings for the cutter-carrying shaft, the inner end of said cutter being capable of being moved in and out of the open center of said sleeve as the heel being trimmed varies in thickness. The support referred to, which is herein called the "sole-support," is arranged with its acting face so inclined to the plane in which the rand-cutters rotate that the shoe will be supported with its rand-crease extending at an angle across the plane of the rand-cutters, whereby any given point in the rand-crease to be trimmed will approach the place of trimming obliquely as the shoe is turned to present all parts of the edge of the heel to the rand-cutters and edge-cutters and will not get into the path of the rand-cutters, so as to be attacked by them until it reaches approximately the place where the trimming of the edge of the heel is taking place. In the embodiment of this feature of my invention herein illustrated the sole-support is so arranged that the extent of its inclination to the plane of the rand-cutters may be varied to suit different classes of work, and preferably, also, so that said inclination can be reversed to enable shoes to be trimmed either from left to right or from right to left. The sole-support is also arranged to be adjusted for supporting the shoe to have its edge trimmed either square or beveled at any desired angle to its tread-face. The sole-support is therefore arranged to be inclined both horizontally and vertically to the plane of rotation of the rand-cutters. In the preferred embodiment of this feature of my invention above described the sole-support comprises a face-plate adjustably mounted on a stand, the latter having suitable ears which coöperate with a projection from said carrier, said ears and projection receiving through them a bolt or device by which the stand may be confined in adjusted position.

In reissued United States Letters Patent No. 11,770, granted to me September 5, 1899, there are shown two guides to assist the operator in governing the depth of the cut, these guides being interposed between the cutter and the heel, so that the heel will contact with one or the other of them, the operator being thereby assisted in governing the depth of the cut. The guides shown in said patent were narrow and adapted to contact only with the lower portion of the edge of the heel, so that it was necessary to use two of those guides in order to insure having a support for the edge of the heel while both scarfs were being trimmed. In the machine of this application I have devised a single edge-guide adapted to contact either with the heel or with the shank, as may be required, while one or the other of the scarfs of the heel is being trimmed. I secure these functions for my single edge-guide preferably by making it of a width substantially equal to the thickness of the heel, so that it is adapted to contact either with the heel or with the shank, as may be required, according to which side of the heel is being trimmed. Said guide when the scarf of the heel at one side of the shoe is being trimmed contacts with the heel in the rear of the scarf, and when trimming the scarf at the opposite side of the shoe the guide acts against the edge of the shank at a point in advance of said scarf. I believe I am the first to devise in a machine of this class a guide to support the edge of a heel and assist the operator in governing the depth of the cut, said guide being adapted to contact with and support either the shank of the shoe or the heel, as may be desired, in trimming around the heel. The working end of the edge-guide is made adjustable toward and from the axis of rotation of the cutter to provide for different diameters of cutters, and it is also adjustable about the center of rotation of the cutter that it may be put in the position where the operator from his height or otherwise may most handily hold the heel against it. The working face of the guide always acts as a barrier or stop to prevent that part of the shank or heel edge in contact with the guide from touching the blades of the cutter. This edge-guide is of a width at its working end sufficient to present a bearing-surface located near the rand-guide which runs in the rand-crease of the shoe being trimmed, so that said edge-guide may contact with that portion of the heel or sole which is adjacent to the rand-crease, and therefore properly support the shoe as the scarfs are being trimmed at either side of the heel. When a shoe is so supported by said edge-guide, the liability is avoided of the cutter gouging into the sole at the point where the scarf or inclined part of a spring-heel connects the shank of the shoe with the tread of the heel end of the sole. The edge-guide is inclined backwardly from its working end toward its support and in the direction of rotation of the cutter in order that it may be out of the way of the ball of the shoe when the shank is being trimmed. In said reissued patent I have shown a sleeve mounted to slide longitudinally of a rotatable shaft and having an attached cutter and rand-guide, the necessary variations in the position of the cutter for trimming heels of varying thickness being secured by the sliding of the sleeve. I have found by experience, however, that a more practical and satisfactory machine can be constructed by attaching the cutter directly to the rotatable shaft and so mounting said shaft that it is capable of movement longitudinally of its axis of rotation.

I believe I am the first to use in a machine of this class a rotary cutter attached to a shaft movable freely longitudinally of its axis of rotation to trim heels of varying thickness, and I desire to claim the same broadly. I prefer to use with this shaft and its cutter a yielding stop, which by bearing on the end of the shaft at times serves to steady it in its rotation, and normally this stop will act against the shaft or the screw at the end thereof when the cutter is in position to trim a heel having about the average thickness of the lot of heels being worked upon.

The machine herein to be described for trimming spring-heels has been devised to trim spring-heels on turned shoes, as well as upon McKay-sewed or other forms of boots and shoes. In the turned shoe there is practically no rand-crease, whereas in other forms of shoes there is a well-defined rand-crease. To trim the heel of a turned shoe, the shaft during the trimming operation is slid in its bearings longitudinally as the heel decreases in height by or through the action of the upper of the shoe upon a shield which is of only slightly greater diameter than the cutter itself and which is applied to the outer end-face of the cutter and secured by the usual screw employed for holding the cutter on its shaft. When trimming the heels of other shoes than turned shoes, where there is a well-defined rand-crease I use a rand-guide for entering the crease instead of the shield. The shield and the rand-guide differ each from the other mainly in that the shield is substantially of the same diameter as the cutter, while the rand-guide is of greater diameter than the cutter, the periphery of the rand-guide projecting beyond the portion of the periphery of the cutter next to it.

The sole-support and the edge-guide are herein represented as so sustained that they may be adjusted in unison in the direction of the axis of rotation of the cutter and rand-guide, and consequently it becomes possible to adjust the edge-guide to occupy a position crossing the plane in which the rand-guide rotates, and when the edge-guide is in such a position a very thin heel or other piece of work may be trimmed. The invention to be herein described is not, however, limited to the precise adjustment, hereinbefore named, of the parts. For instance, I may adjust the yielding stop referred to so that it will occupy a balanced position to touch the screw in the end of the cutter-carrying shaft when the rand-guide stands in the rand-crease of a heel of the minimum thickness, and thereafter as the thickness of heels increases to the maximum thickness the stop will yield and act as a steadying device for the said shaft, cutter, and rand-guide in their longitudinal movements.

In the drawings, Figure 1 in side elevation represents a heel-trimming machine containing my improvements. Fig. 2 is a partial side elevation of a heel-trimming machine containing my improvements. Fig. 3 is a section in the line $x$, Fig. 2, looking to the right. Fig. 4 is a top or plan view of the parts shown in Fig. 2. Fig. 5 is an enlarged detail showing part of the yielding pressure device or spring-held stop. Fig. 6 is a section of Fig. 4 in the line $x'$. Fig. 7 is an enlarged left-hand end elevation of the parts shown in Fig. 4, the dotted outline showing a shoe in the position which it occupies when the trimming of its heel is being completed. The arrow indicates the direction in which the shoe has been turned. Fig. 8 is an enlarged side elevation of part of the heel which has been trimmed and part of the shoe carrying it, together with the sole-support and edge-guide, the figure also showing in outline the heel-trimming cutter. The arrow indicates the direction in which the shoe has been turned. Fig. 9 is an enlarged detail of the edge-guide detached. Fig. 9$^a$ shows a modified form of edge-guide, the roller being omitted. Fig. 10 is a top view of the face part of the sole-support detached from its holder. Fig. 11 is an edge view of the same looking at it from the position in which it is supported in Fig. 2. Fig. 12 is a horizontal section through the boss $c$ to show its enlarged hole and the smaller bolt therein to provide for adjustment of the stand carrying the sole-support. Fig. 13 is a transverse section of the stud $f^2$ in the dotted line $x^5$, Fig. 5. Fig. 14 is a modification wherein provision has been made for trimming a spring-heel on a turned shoe.

The framework of the machine consists, essentially, of a head A, supported on a column A', supposed to stand upon the floor, said column supporting in its lower end a power-actuated counter-shaft $A^2$, having a pulley $A^3$, on which is a belt $A^\times$, which is extended over a pulley $B^2$, surrounding the cutter-shaft B, said pulley $B^2$ having a clamp within it next said shaft, said clamp being acted upon by screws B', by the rotation of which in one direction the clamp may be loosened sufficiently to enable the shaft B to be slid longitudinally in or with relation to the pulley $B^2$, and thereafter by turning the said screws in the opposite direction the clamp may be acted upon to fix the said pulley $B^2$ to the shaft B. The head A has at its upper end suitable bosses $A^{2\times}$ and $A^{3\times}$, said bosses receiving, respectively, bearings $a$ and $a'$ for the rotatable cutter-carrying shaft B. The bearing $a$ is confined in position by bolts $a^2$, while the bearing $a'$ is confined in position by bolts $a^3$. The bearing $a'$ has a forwardly-extended part $a^4$, upon which is adjustably clamped, as by a bolt $b$, having a head $b^\times$, and a nut $b'$, a carrier C, shown as a cylindrical sleeve. The bolt $b$ is extended through an ear $b^{10}$ of the carrier, while the head $b^\times$ of the bolt is located in an opening $b^{12}$ of the carrier and bears upon the extended part $a^4$, so as to act as a clamp against said part $a^4$. The ends of the belt-pulley $B^2$ terminate at a distance from the opposed inner ends of the bearings $a$ and $a'$, so that the shaft B may slide somewhat without said pulley meeting said bearings. The shaft B has its front end reduced in diameter to leave a shoulder 3, and the extremity of the shaft is threaded to receive a screw 4. The shoulder 3 of the shaft receives against it one end of the hub 5 (see Fig. 6) of the rotary cutter E, which has blades of any usual or suitable shape for trimming the edge of the heel and also for trimming out the rand-crease. The rand-crease is formed between the shoe-upper on one side and the top of the heel or sole on the other, and while the upper side of the crease is smooth the lower or heel side is rough and requires to be beveled slightly in order to form a rand-crease of uniform width and finished appearance. The beveling of the heel side of the rand-crease, or the "trimming of the rand," as it is sometimes called, may be done by a rand-cutter applied to the outer end of the edge-trimming cutter or preferably, and as herein illustrated, by rand-cutting lips $e$, formed on the outer ends of the heel-trimming blades of the cutter E. (See Figs. 6, 7, and 8.) A rand-guide covers the outer ends of the cutting-blades and lips $e$, and running in the rand-crease against the upper side thereof protects the upper from injury by the cutter. The cutter having been applied to the reduced end of the shaft, the rand-guide F may be put in position against the outer end of the cutter, and thereafter the screw 4 is put through the central opening of the rand-guide and screwed into the threaded hole in the end of the cutter-carrying shaft, said screw confining the rand-guide and cutter in position to be rotated by the shaft and forming practically the front end of the shaft.

The carrier C, before mentioned, is represented as applied to an extension $a^4$ of the bearing $a'$, so as to leave a space $e^\times$, which may receive the inner end of the cutter, said cutter being adapted to play in and out in said space according to variations in thickness of the heels being trimmed—that is to say, according to the extent to which the cutting edges of the blades of the cutter require to be exposed for contact with the heel being trimmed or with the different portions of a heel being trimmed. The carrier C has extended from it at $c$ a boss having a large hole $c^2$ to receive loosely a small bolt $c'$, said bolt extending, as herein shown, through ears of a stand or holder C', to which is connected in suitable manner, as by screws 2 2 and a stop-screw $2^\times$, a plate $C^2$, which constitutes a sole-support, against which is rested the tread-face of the spring-heel or other heel to be trimmed.

I have found by experience that a sole-support the face of which is substantially parallel with the plane in which the rand-cutters rotate is objectionable for the reason that there is a constant tendency for the rand-cutters to gouge into the upper side of the heel. This difficulty is due, in part at least, to the irregularities in the upper surface of the heel which forms the heel side of the rand-crease. When the shoe is supported and fed with the rand-crease parallel to the plane in which the rand-cutters rotate, these cutters by engaging the projecting irregularities in advance of the point on the heel where the trimming is taking place tend to gouge into the heel side of the rand-crease too deeply, and in this way shoes are frequently damaged. I have overcome this difficulty in the following way: I find that this tendency to cut into the upper side of the heel is obviated if I so arrange my sole-support with relation to the plane in which the rand-cutters rotate that when the shoe is presented toe upwardly for trimming the heel from the left side around to the right side the plane of the rand-crease will extend aslant across the plane of the rand-cutters, and, further, so that as the shoe is turned to bring all parts of the heel side of the rand-crease to the point at which the trimming is taking place any given point in the heel side of the rand-crease in advance of the place of trimming will be first on the right-hand side of the plane of the rand-cutters and as the shoe is turned will approach the plane of the rand-cutters, but not get into said plane, so as to be attacked by said rand-cutters until the shoe has been turned far enough to bring the edge of the heel adjacent said given point to the place of trimming. In the further movement of the shoe the said given point after crossing the plane of the rand-cutters at the place of trimming and being acted upon by them will of course move obliquely to the left of said plane. Fig. 8 shows the relation of the sole-support and cutters for thus trimming a shoe, the shoe being shown in full lines in the position it occupies when the trimming is nearly completed. Those points in the rand-crease adjacent the cutter which have been trimmed are seen to be at the left of the plane of the cutting-lips $e$ and all points yet to be trimmed are at the right of the said plane. In case the workman prefers to begin to trim the heel at the right-hand side of the shoe he must present the shoe with the toe pointing downwardly and must turn the shoe upwardly—that is, in the opposite direction from that in which it was turned when the trimming was begun at the left-hand side of the shoe. In order to have the heel side of the rand-crease to be trimmed approach the rand-cutters from the right, as described, so as to insure that the parts thereof will not be attacked by the rand-cutters until they reach the place of trimming, it is necessary to reverse the inclination of the sole-support— that is, incline it downwardly and forwardly instead of downwardly and backwardly, as shown in Fig. 8. When the sole-support is thus reversely inclined and the workman begins trimming on the right-hand side, a given point on the heel side of the rand-crease will approach the plane of the rand-cutters from the right as the shoe is turned and will not reach the plane of said cutters and be attacked by them until it nearly reaches the place of trimming, and after it passes said place of trimming it will move to the left out of the plane of the rand-cutters the same as when trimming from left side to right side, as first described.

I have found by practical experience that where the rules above laid down as to the positioning of the sole-support are followed the danger is obviated of gouging into the heel at the lower side of the rand-crease.

The sole-support $C^2$ is tapered, as seen in Figs. 2, 8, and 11, so that in its normal adjustment, which is that for beginning the trimming on the left-hand side of the shoe, as is usually desired, its acting face is inclined downwardly and backwardly. This inclination can be changed, however, when it is desired to begin the trimming at the right-hand side of the shoe by loosening the attaching-screws 2 2 and adjusting the stop or backing screw $2^\times$ (see Figs. 2 and 7) to swing the lower end of the sole-support away from the stand or holder $C'$ until its acting face is inclined downwardly and forwardly. By different adjustments of these screws the extent of the backward or forward inclination of the sole-support can be varied as may be required.

The stand or holder $C'$ for the sole-support $C^2$ may be adjusted axially about the attaching-bolt $c'$ to incline the sole-support $C^2$ more or less backwardly or forwardly in a horizontal plane with relation to the cutter to vary the inclination of the bevel formed by the cutter on the edge of the heel. Thus it will be seen that the sole-support is adapted to sustain the shoe with the tread-face of the sole and heel inclined in two directions perpendicular to each other—that is, inclined both horizontally and vertically to the plane of rotation of the rand-cutters, as shown in Fig. 8, and that the extent of each of these inclinations may be varied by adjusting the stand $C'$ and the stop-screw $2^\times$. The sole-support $C^2$ also may be adjusted parallel with or transverse to the cutter-shaft by differently positioning the stand $C'$ with relation to the boss $c$, the small attaching-bolt $c'$ and large hole $c^3$ permitting this adjustment, as may be seen in Fig. 12. The carrier C also has a boss, as at $d$, the face of which (see Fig. 7) is provided with a groove $d'$, in which is secured a carriage $d^2$, having a threaded boss $d^3$, said boss receiving the threaded shank of an adjusting-screw $d^4$, said screw being provided at its inner end with a projection 16, which enters a notch 17 (see Fig. 9) in the guide G. The carriage $d^2$ has extended from it a threaded stud $d^5$, which enters the hole 18 of the guide G, and said threaded stud has applied to it a nut $d^6$, which may be turned to clamp the guide rigidly upon said carriage, and at the same time the turning of the nut causes the carriage, which has V-shaped edges entering V-shaped grooves at the sides of the guideway $d'$, to be clamped firmly in any position desired. By loosening the nut $d^6$ the carriage may be slid more or less in the groove $d'$ about the center of rotation of the cutter, thereby to place the acting face $g$ of the guide in such position that the operator may hold and present the work to the cutter to the best advantage, and by rotating the screw $d^4$ the guide G may be turned more or less about the stud $d^5$, projecting from the carriage, thereby to put the acting face of the guide at the proper distance from the path of travel of the blades of the cutter to enable the guide to follow up the diminishing diameter of the cutter due to grindings. By placing my guide very near the cutter and interposing it to as great an extent as possible between the cutter and the heel I secure a guide for contacting with the shoe very near to the point at which the trimming is taking place, and this guide is of great assistance in enabling the operator to regulate the depth of the cut.

In some classes of work where cement is used in the heel or sole the cement on the material adheres to the guide, arresting the free movement of the work, and to prevent this I have provided the guide with a roller $g^{10}$, suitably sustained therein, against which the heel or the parts of the shoe being trimmed may contact during the trimming operation, said roll also obviating the accumulation or lodging of chips or shavings of leather at and about the upper end of the guide; but my invention would not be departed from should the roll $g^{10}$ be omitted and the acting end of the guide present an edge, as in Fig. 9$^a$.

The head of the screw 4 at the outer end of the shaft B is represented as acted upon, as it may be when desired, by an adjustable yielding stop $f$, herein shown as a finger slotted to embrace (see Fig. 5) a threaded projection $f'$ of a stud $f^2$, said finger being mounted on a pivot 14, (see Figs. 4 and 13,) extended through ears $f^{10}$ of said finger and entering said stud at one side of the longitudinal center thereof. The finger has joined to it one end of a spiral or other spring $f^3$, the opposite end of which is connected with a projection 6, extended from the stud $f^2$. The rear end of the stud $f^2$ enters a bearing $f^4$, extended, it may be, from the bearing $a'$, said stud being surrounded between said bearing and a collar $f^5$ thereon by a spring $f^6$, which presses the stud in the direction of the arrow near it in Fig. 4, so as to hold a pin or projection $f^7$ of said stud at the opposite end of said bearing normally in a notch in said bearing, and thereby restrain the stud from rotation in its bearing. The threaded projection $f'$ of the stud $f^2$ receives upon it outside said finger a nut $f^8$, which may be manipulated to adjust said finger about the pivot 14 in opposition to the stress of the spring $f^3$ and put the finger in an established, normal, or balanced position. A locking-nut $f^9$ coöperates with the nut $f^8$ to hold the latter and keep the finger in its adjusted position. The ears $f^{10}$ of the finger $f$ coöperate with suitable secant faces $f^{12}$ (see Figs. 5 and 13) of the stud, said ears and faces preventing the rotation of the finger on the stud. When it is desired to get the finger out of the way to permit the removal of the rand guide and cutter, the stud $f^2$ may be moved backwardly in opposition to the arrow near it in Fig. 4 to remove the locking device $f^7$ from its operative engagement with the notch in the hub $f^4$, and then said stud may be rotated, putting the finger in the dotted-line position in Fig. 4. The finger acted upon by the spring $f^3$ will preferably be so adjusted by the nut $f^8$ as just to touch the screw 4 when a heel of the average thickness has had its rand-crease placed on the rand-guide and the tread-face of the heel placed in contact with the sole-support $C^2$. The spring $f^3$ will yield somewhat as the shaft, cutter, and rand-guide are moved away from the sole-support by any increase in thickness of the heel, the stop or finger $f$ at such time acting to steady the shaft in its longitudinal movement. Should, however, the heel to be trimmed be less in thickness than the average for which the stop or finger was adjusted, the upper of the shoe at one side of the rand-crease will act upon the outer face of the rand-guide when the shoe is pressed toward the tread-support, causing the shaft and cutter to move longitudinally of this axis of rotation, the cutter moving into the sleeve or carrier C. The screw 4 will thus be removed from from contact with the yielding stop $f$, and the position of the shaft, cutter, and rand-guide then will be controlled by the action of the walls of the rand-crease upon the rand-guide.

The yielding stop $f$ may be and is so balanced that it is very delicate in its action, and with some classes of work it may be dispensed with. While the stop is handy and may be required by some operators, yet others might run the machine successfully without it, and I have learned by experience that a spring-stop is not actually essential to the successful operation of a machine of the character herein indicated, as the rapidly-rotating cutter-shaft slides very easily in its bearings, and the action of the driving-belt on the shaft causes it to return to normal position when displaced from such position by heels varying only normally in thickness, so that with some operators the spring-stop may be dispensed with. I therefore do not limit my invention to a machine having the shaft or cutter spring-pressed or having a stop to limit the movement of the shaft. For heels varying abnormally, however, most operators, especially if not skilled, will require the spring-controlled stop.

From the foregoing description it will be understood that the shaft having fixed to it the cutter and rand-guide may, during the rotation of said shaft with the rand-guide running in the rand-crease, freely slide longitudinally in its bearings, as may be required to adapt the machine to trim heels varying in thickness, the inner end of the cutter as the heel decreases in thickness entering the space at the end of the sleeve C by the pressure of the upper at one side of the rand-crease against the outer side of the rand-guide; but increase in thickness of the heel during the operation of trimming will cause the shaft to be moved in a direction to remove the cutter from the space $e^x$, the screw at the outer end of the shaft acting against the stop, which serves to steady the shaft during such outward sliding movement of the shaft, cutter, and rand-guide.

Fig. 14 illustrates a modification of my invention adapted for use in trimming turned shoes, said modification showing as a substitute for the rand-guide a shield of substantially the same diameter as the cutter, the shield contacting with the outer end of the cutter and preventing said end from meeting the upper. By the employment of the shield it is possible to trim spring-heels on what are known as "turned shoes," and other shoes wherein there is practically no rand-crease, and when this shield is used I adjust the shaft so that the screw at the end thereof will in the normal position of the shaft contact with the stop $f$. It should be understood that this shield is merely a substitute for the rand-guide, its decreased diameter being necessary on account of the shape and nature of the turn-shoe. The action of the upper on the outside of the shield is, however, the same as on the rand-guide, and I consider such a shield as an equivalent for the rand-guide and covered by the claims hereinafter contained. If the heel to be trimmed is of the full thickness for which the stop has been set, then the upper of the shoe in contact with the inner end of the heel will be put against the outer end of the shield, and the cutter in its rotation, it being carried by a shaft such as herein described, and lettered B, will properly trim such heel; but in case the heel is of less thickness than provided for by the adjustment of the stop $f$, as above stated, then in such case the operator will press the upper against the outside face of the shield and carry the tread-face of the heel against the sole-support, which may be the same as that described, and illustrated in Figs. 4, 7, and 8, and in so doing the shaft B will be moved longitudinally in its bearings, the inner end of the cutter entering more or less the open end of the carrier or sleeve.

Having described my invention, what I claim as new, and desire to secure by Letters Patent, is—

1. In a heel-trimming machine, a suitable bearing for a shaft, a rotatable shaft mounted in said bearing and capable of free endwise movement according to variations in the thickness of the heels, and a cutter mounted on said shaft and movable therewith longitudinally of the axis of rotation of said shaft to trim heels of varying thickness.

2. In a heel-trimming machine, a bearing for a shaft, a rotatable shaft mounted in said bearing and capable during the operation of trimming a heel, of free endwise movement therein, and a cutter and a rand-guide carried by said shaft.

3. In a heel-trimming machine, a bearing for a shaft, a rotatable shaft mounted in said bearing and capable of free endwise movement therein, a cutter and a rand-guide carried by said shaft, and a sole-support located at one side the plane in which said rand-guide rotates, said rand-guide being adapted to run freely in any position required by the thickness of the heel to be trimmed.

4. In a heel-trimming machine, a shaft-bearing, a shaft freely movable endwise and provided with a cutter and rand-guide, adjustable means to limit the free endwise movement in said bearing of said shaft with its cutter and rand-guide during the operation of trimming heels varying in thickness, said endwise movement being of an extent sufficient to enable the rand-crease acting through the rand-guide, to slide the shaft with its cutter more or less to adapt it to the thickness of heel being trimmed.

5. In a heel-trimming machine, a support to sustain the tread of the heel, a shaft-bearing, and a shaft having a connected cutter and rand-guide, said shaft being capable of free endwise movement in said bearing in either direction as the rand-guide runs in the rand-crease of heels of different thickness.

6. In a machine for trimming heels, a rotatable shaft freely movable longitudinally of its axis of rotation and provided with a trimming-cutter and a rand-guide to enter and run in the rand-crease; combined with a yielding stop acting to limit the extent of endwise movement of said shaft.

7. In a machine for trimming heels, a rotatable shaft free to be slid to and fro in its bearings and provided with a trimming-cutter and a rand-guide, the latter adapted to enter and run in a rand-crease; combined with a yielding stop acting normally against the end of said shaft, and means to adjust the effective strength of said yielding stop.

8. In a machine for trimming heels, a rotatable shaft free to be slid to and fro in its bearings and provided with a cutter and rand-guide the latter entering and running in the rand-crease; combined with a stationary part having a recess in which the inner end of said cutter may move to and fro as the rand-guide runs in the rand-creases of heels of varying thickness, the movement of the rand-guide with relation to the said stationary part uncovering more or less of the cutting edges of the cutter.

9. In a machine for trimming heels, a rotatable shaft free to be slid to and fro in its bearing and provided with a cutter and a rand-guide, the latter entering and running in the rand-crease, a carrier adjustably mounted on said bearing, a guide mounted on said carrier, and means to adjust the carrier to change the position of the acting face of the guide.

10. In a machine for trimming spring-heels, a rotary cutter, a rand-guide, and a guide provided with a contact-surface shaped to support the shank of the shoe while the scarf of the spring-heel is being trimmed and positioned so as to support the shoe immediately adjacent to the point at which the trimming is taking place.

11. In a heel-trimming machine, a guide to assist in governing the depth of the cut and positioned to support the shoe immediately adjacent to the point at which the trimming is taking place, said guide being provided with an acting face shaped to contact either with the edge of the shank, or with that portion of the heel next to the upper.

12. In a machine for trimming spring-heels, a cutter, and a guide having a straight guiding-face substantially as wide as the depth of the heel to be trimmed and adapted to serve as a rest for the edge of the heel immediately adjacent to the point at which the trimming is taking place.

13. In a machine for trimming spring-heels, a guide to assist in governing the depth of the cut, said guide having a wide acting face and a narrow shank disposed out of the path of the shoe as it is turned to present different parts of the heel to the cutter, said guide being adapted to serve as a rest for the edge of the shank while one scarf is being trimmed, and also to support the edge of the heel while the other scarf is being trimmed.

14. In a heel-trimming machine, a rotary cutter, a stationary support for the tread-face of the heel, and a guide to assist in governing the depth of the cut, said guide having a narrow shank lying close to the plane of said support and a wide acting face to contact through the trimming operation with the edge of the heel from its tread-face to the rand-crease.

15. In a heel-trimming machine, a rotatable cutter and a sole-support arranged to be inclined more or less, both vertically and horizontally, to the plane of rotation of the cutter.

16. In a heel-trimming machine, a rotatable cutter comprising rand-cutting lips, a sole-support arranged to be inclined, both vertically and horizontally, to the plane of rotation of said rand-cutting lips, and means for adjusting the sole-support to vary the angle of said inclinations.

In testimony whereof I have signed my name to this specification in the presence of two subscribing witnesses.

BENJAMIN F. MAYO.

Witnesses:
GEO. W. GREGORY,
MARGARET A. DUNN.